United States Patent [19]

Takahashi et al.

[11] Patent Number: 5,298,317
[45] Date of Patent: Mar. 29, 1994

[54] AIR BAG COATING COMPOSITION, AIR BAG AND PREPARATION THEREOF

[75] Inventors: Masaharu Takahashi; Kazuma Momii, both of Annaka, Japan

[73] Assignee: Shin-Etsu Chemical Co., Ltd., Tokyo, Japan

[21] Appl. No.: 957,839

[22] Filed: Oct. 8, 1992

[30] Foreign Application Priority Data

Oct. 8, 1991 [JP] Japan .................... 3-289195

[51] Int. Cl.$^5$ .................................... B32B 27/08
[52] U.S. Cl. ........................... 428/266; 528/24; 528/37
[58] Field of Search .............. 428/266; 525/474; 528/24, 37

[56] References Cited

U.S. PATENT DOCUMENTS 3,983,272  9/1976  Huber et al. .................. 428/266
4,530,874  7/1985  Hendrix et al. ................ 428/266

FOREIGN PATENT DOCUMENTS 0431881   6/1991  European Pat. Off. .
0508372  10/1992  European Pat. Off. .

OTHER PUBLICATIONS

WPIL, Derwent Pub. Ltd., AN=91-364514 & JP-A-3 243 442.
WPIL, Derwent Pub. Ltd., AN=90-372957 & JP-A-2 270 654.

Primary Examiner—Melvyn I. Marquis
Assistant Examiner—D. Aylward
Attorney, Agent, or Firm—Millen, White, Zelano, & Branigan

[57] ABSTRACT

An air bag coating composition predominantly comprising an organopolysiloxane having a degree of polymerization of 1,000 to 10,000 and a molecular weight distribution index (Mw/Mn) of less than 5 is provided. The composition is applied and cured to an air bag base fabric without strike-through.

7 Claims, 1 Drawing Sheet

AIR BAG COATING COMPOSITION, AIR BAG AND PREPARATION THEREOF

FIELD OF THE INVENTION

This invention relates to an air bag coating composition and more particularly, to a coating composition suitable for forming coatings on plain weave fabrics of polyester, polyimide and nylon for air bags. It also relates to an air bag having a coating of the composition cured to a base fabric and a method of preparing the same.

BACKGROUND OF THE INVENTION

For safety, advanced automobiles are now loaded with air bags which are normally folded and received in the steering wheel, but upon detection of shocks by collision, can be instantaneously inflated between the wheel and the driver to protect the driver from damages. The air bags are generally formed from nylon fabric by coating it with chloroprene rubber. These air bags undesirably have a short life since chloroprene rubber is less resistant against heat and weathering. The air bags are required to be flame retardant so that they are resistant against a fire and explosion which can break out upon collision of the car. Since chloroprene rubber is less flame retardant, prior art air bags formed from chloroprene rubber-coated fabric are further coated with a flame retardant silicone where they might be exposed to a blast.

Air bags formed from silicone rubber-coated fabric have the advantage of eliminated need for a flame retardant coating because well-known flame retardants can be blended in the silicone rubber to render the rubber itself flame retardant. Now air bag manufacturers are more interested in silicone rubber coating compositions for this reason and for their heat resistance and weather resistance.

A variety of silicone coating compositions have been developed for air bags. Various internal additives are incorporated in these compositions for imparting adhesion, flame retardancy, weather resistance, and heat resistance. As a result of concentrated efforts, currently available silicone rubber-base air bag coating compositions have superior characteristics to chloroprene rubber-base compositions.

However, conventional silicone coating compositions have a strike-through problem when applied to air bag base fabric of nylon or the like. In general, nylon base fabric on one surface is coated with a silicone coating composition using a knife coater, comma coater, gravure coater, offset roll coater or the like, often a knife coater and comma coater. On application, the silicone coating composition can penetrate or strike through the interstices of the nylon fabric. The struck-through composition on the fabric rear surface not only adversely affects the outer appearance of the fabric or air bag, but also reduces operating efficiency because the struck-through composition will adhere to backup rolls of the coating machine and if so, the coating machine must be stopped to remove the deposits. Since the struck-through portion is cured on the fabric rear surface at the same time as curing of the composition, if the coated fabric after curing is wound up and stored in roll form without special care, blocking would occur between the coating and the rear surface. The strike-through phenomenon occurs regardless of whether the silicone coating composition is applied with or without diluting it with solvent.

According to our investigations, the strike-through phenomenon takes place for the following reason associated with both the coating machine and the coating composition. When the coating composition is applied to air bag fabric by means of a coating machine, the composition must be adjusted to an adequate viscosity of 10,000 to 50,000 centistokes (cs) in order to form a thin coating with an optimum thickness of about 30 to 100 μm, especially about 40 to 70 μm in the case of silicone coatings. One typical prior art method to comply with this viscosity is to dilute a ultra-high molecular weight base polymer with a solvent to an adequate viscosity. Since the high molecular weight polymer generally has a wide distribution of molecular weight as synthesized, relatively low molecular weight polymer components contained therein tend to strike through the fabric when diluted with the solvent. Some polymers are designed to reduce the degree of dilution or to eliminate dilution prior to coating. However, polymers of such special design cure into coatings which are so weak that they will crack upon inflation of the air bag. Also, due to their reduced molecular weight, low-molecular weight components tend to penetrate through the fabric interstices, resulting in a strike-through phenomenon.

It is evident from above that the strike-through phenomenon occurs due to the low viscosity of the silicone coating composition upon coating and the relatively high content of low-molecular weight components in the silicone coating composition as a result of a wide molecular weight dispersion of the base polymer therein.

SUMMARY OF THE INVENTION

It is an object of the present invention to provide a silicone coating composition which can be applied at an adequate viscosity by means of a coating machine such as a knife coater or comma coater without inducing the strike-through phenomenon.

It is another object of the present invention to provide a method of preparing an air bag by means of a coating machine without inducing the strike-through phenomenon.

We have found that an improved air bag coating composition can be formulated from a base polymer in the form of an organopoly-siloxane of the following average compositional formula (1):

$$R_aSiO_{(4-a)/2} \tag{1}$$

wherein R is a substituted or unsubstituted monovalent hydrocarbon group and letter a is a number of 1.98 to 2.01, having a degree of polymerization of 1,000 to 10,000 and a molecular weight distribution index (Mw/Mn) of less than 5. This coating composition can be adjusted to an adequate viscosity of about 10,000 to 50,000 cs to form a coating having an optimum thickness and applied at the viscosity to air bag base fabric by means of a coating machine such as a knife coater or comma coater without strike-through. The coating composition does not strike through the interstices of a plain weave fabric which is a most typical air bag fabric.

Therefore, the present invention provides an air bag coating composition comprising an organopolysiloxane of the following average compositional formula (1):

$$R_aSiO_{(4-a)/2} \quad (1)$$

wherein R is a substituted or unsubstituted monovalent hydrocarbon group and letter a is a number of 1.98 to 2.01, having a degree of polymerization of 1,000 to 10,000 and a molecular weight distribution index (Mw/Mn) of less than 5.

The present invention also provides a method of preparing an air bag comprising applying an air bag coating composition to one surface of an air bag base fabric, and curing said air bag composition, said air bag coating composition comprising an organopolysiloxane of the following average compositional formula (1):

$$R_aSiO_{(4-a)/2} \quad (1)$$

wherein R is a substituted or unsubstituted monovalent hydrocarbon group and letter a is a number of 1.98 to 2.01, having a degree of polymerization of 1,000 to 10,000 and a molecular weight distribution index (Mw/Mn) of less than 5.

BRIEF DESCRIPTION OF THE DRAWINGS

The only FIGURE is a schematic view showing a process of applying a coating composition to an air bag base fabric.

The coating arrangement is schematically illustrated in FIG. 1. A nylon fabric is unraveled from a roll 1 and fed around rollers including a guide roller, an applicator roller and a backup roll 4. A knife 2 is located just above the applicator roller to apply a coating composition 3 to one surface of the fabric. The coated fabric then passes through a drying zone 5 where it is dried and cured.

DETAILED DESCRIPTION OF THE INVENTION

Figure 1:
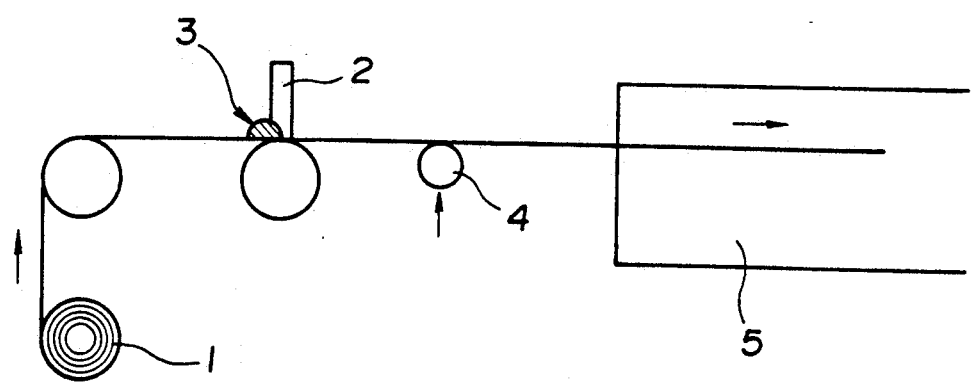

The air bag coating composition of the present invention is predominantly comprised of an organopolysiloxane of the following average compositional formula (1):

$$R_aSiO_{(4-a)/2} \quad (1)$$

wherein R is a substituted or unsubstituted monovalent hydrocarbon group having 1 to 10 carbon atoms and letter a is a number of 1.98 to 2.01. The degree of polymerization of this unit ranges from 1,000 to 10,000 and the molecular weight distribution index (Mw/Mn) is less than 5.

The organopolysiloxane used as a base polymer of the air bag coating composition has average compositional formula (1): $R_aSiO_{(4-a)/2}$ wherein R groups may be identical or different and selected from substituted or unsubstituted monovalent hydrocarbon groups, for example, alkyl groups such as methyl, ethyl, propyl, butyl and hexyl groups; cycloalkyl groups such as cyclohexyl; alkenyl groups such as vinyl and allyl groups; aryl groups such as phenyl and tolyl groups; and substituted ones of these groups in which one or more of the hydrogen atoms attached to carbon atoms are replaced by halogen atoms, cyano groups or the like, such as chloromethyl, trifluoropropyl and cyanoethyl groups. Letter a is a positive number of 1.98 to 2.01. The preferred R groups are methyl, ethyl, phenyl, trifluoropropyl, cyanoethyl, vinyl and allyl groups. More preferably methyl group is present in an amount of at least 50 mol %, especially at least 80 mol % because those organopolysiloxanes containing less than 50 mol % of methyl group based on the total R group will lose the properties inherent to methylpoly-siloxane or become expensive.

In addition, the organopolysiloxane should have a degree of polymerization of $R_aSiO_{(4-a)/2}$ units of 1,000 to 10,000 and a molecular weight distribution index (Mw/Mn) of less than 5. If the degree of polymerization is less than 1,000, the silicone coating composition will readily strike through air bag fabrics such as nylon fabrics. With a degree of polymerization of 1,000 or higher, if Mw/Mn is 5 or higher, then the high molecular weight polymer has a wider dispersion to allow strike-through. Also, if the degree of polymerization is less than 1,000, the silicone coating composition cures to a coating which is insufficient in mechanical strength and unacceptable for practical use. For these reasons, the degree of polymerization should be 1,000 or higher. If the degree of polymerization is more than 10,000, the resulting coating composition cannot be applied to a desirable coverage of about 30 to 100 g/m² when it is adjusted to a viscosity of about 10000 to 50000 cs which is regarded optimum for coating. Better results are obtained when the organopolysiloxane has a degree of polymerization of 2,000 to 6,000. The molecular weight distribution index is preferably 4.5 or less, more preferably 4 or less. The theoretical lower limit is 1.0 although it is usually 1.1. It is to be noted that the molecular weight distribution index is a weight average molecular weight (Mw) divided by a number average molecular weight (Mn).

The organopolysiloxanes may be substantially linear and end blocked with a silanol, methyl or vinyl group, especially with a trivinylsilyl group. They may be prepared by subjecting cyclic polysiloxanes known as oligomers to ring opening polymerization in the presence of acid or alkali in accordance with a well-known method.

Included in the coating composition of the invention is a curing agent for causing the organopolysiloxane to cure. The curing agents are well-known ones, typically organic peroxides. In the case of organopolysiloxanes containing an alkenyl group, they may be modified into an addition reaction vulcanization type by adding thereto an organohydrogenpolysiloxane having at least three hydrogen atoms attached to silicone atoms ($\equiv$SiH) in a molecule together with a platinum series catalyst.

Examples of the organic peroxide include benzoyl peroxide, 2,4-dichlorobenzoyl peroxide, ortho-chlorobenzoyl peroxide, di-t-butyl peroxide, dicumyl peroxide, t-butyl perbenzoate, t-butyl peracetate, 2,5-dimethyl-2,5-di(t-butylperoxy)hexane, (t-butylperoxy)myristyl carbonate, etc. The organic peroxides are generally added in amounts of about 0.1 to 5 parts by weight per 100 parts by weight of the organopolysiloxane.

In the embodiment wherein organopolysiloxane containing an alkenyl group such as vinyl is modified into an addition reaction vulcanization type, a combination of an organohydrogenpolysiloxane having at least three hydrogen atoms attached to silicon atoms (or at least three$\equiv$SiH groups) in a molecule with a platinum series catalyst is added. The organohydrogenpolysiloxane is preferably of the following formula:

$$R_b^1H_cSiO_{(4-b-c)/2}$$

In this formula, $R^1$ is an alkyl group having 1 to 10 carbon atoms such as methyl, and letters b and c are positive numbers meeting b+c=1.0 to 3.0. This organohydrogenpolysiloxane is preferably added in such amounts as to provide about 0.5 to 5 mol of ≡SiH group per mol of the alkenyl group in the organopolysiloxane. The platinum series catalyst may be selected from chloroplatinic acid, complex salts of chloroplatinic acid with olefins or vinylsiloxane, and alcohol solutions of chloroplatinic acid. The platinum catalyst is preferably added in such amounts as to provide about 0.5 to 500 parts, especially about 2 to 200 parts by weight of platinum (Pt) per million parts by weight of the organopolysiloxane.

The coating composition of the invention is obtained by uniformly kneading the organopolysiloxane with a predetermined amount of the curing agent. If desired, any well-known conventional adhesive aids may be added. The adhesive aids include silane coupling agents such as γ-glycidoxypropyltrimethoxysilane, γ-mercaptopropyltrimethoxysilane, γ-aminopropyltrimethoxysilane, and vinyltrialkoxysilane, metal salts of organic carboxylic acids, and titanate esters. The coating composition may also contain other well-known conventional additives such as flame retardants, heat resistance modifiers, and dispersants.

Further, various particulate or fibril fillers may be added to the coating composition for the purpose of improving physical properties (hardness, tensile strength and elongation) and adhesive properties of cured coatings resulting therefrom. Such fillers include fumed silica, precipitated silica, ground quartz, diatomaceous earth, hollow glass microspheres, iron oxide, zinc oxide, titanium oxide, magnesium oxide, talc, aluminum silicate, alumina, calcium carbonate, carbon black, asbestos, glass fibers, carbon fibers, polyester fibers, polytetrafluoroethylene powder, and polyvinyl chloride powder. The fillers are preferably added in amounts of about 20 to 200 parts by weight per 100 parts by weight of the organopolysiloxane. Another useful additive is a resinous polysiloxane in the form of a copolymer of $R_3SiO_{\frac{1}{2}}$, $R_2SiO$ and $RSiO_{3/2}$ wherein R is a monovalent hydrocarbon group having 1 to 10 carbon atoms.

In applying the coating composition to air bag fabrics of nylon or the like, the composition is diluted with a suitable organic solvent. Exemplary organic solvents are benzene, toluene, xylene, hexane, heptane, and kerosine. The solvents are preferably added in amounts of about 10 to 1000 parts, more preferably about 100 to 300 parts by weight per 100 parts by weight of the organopolysiloxane and curing agent combined.

The silicone coating composition may be cured under suitable conditions which are selected in accordance with the particular curing mechanism of the composition. Where organic peroxides are used as the curing agent, the compositions may be hot air vulcanized at about 150° to 550° C. for several seconds to about 20 minutes. In the case of addition reaction curing type using an organohydrogenpolysiloxane and a platinum series catalyst, the compositions may be hot air vulcanized at about 100° to 400° C. for several seconds to less than 20 minutes.

Air bags are fabricated by applying the coating composition to air bag base fabric to form a silicone coating thereon, followed by curing. The air bag base fabrics are woven fabrics of polyamides, polyesters or the like, preferably plain weave fabrics of nylon or the like, especially plain weave fabrics of 66-nylon from the standpoints of fabric's strength and bond affinity. Nylon filaments with a fineness of 200 to 840 denier, especially 420 denier are most preferred because they are least liable to strike-through, and best in strength, weather resistance, heat resistance and cost as air bags. A thread count of 46 filaments/inch is most desirable.

Among the benefits of the silicone coating composition according to the present invention is (1) that when the composition is applied to air bag fabric by means of a coating machine such as a knife coater and comma coater, the composition can be adjusted to an adequate viscosity of 10,000 to 50,000 cs to form a coating with an optimum thickness and applied at the viscosity to a plain weave fabric without striking through the interstices thereof. Another benefit is (2) that the use of the silicone coating composition which can eliminate strike-through ensures efficient operation because backup rolls of the coating machine are not contaminated with the composition. (3) The blocking problem that a struck-through portion of a coating composition can cure on the fabric rear surface and give rise to blocking with the coating face during winding-up and storage of the coated fabric in roll form is eliminated, facilitating subsequent operations on the coated fabric including punching-out and sewing. A completed air bag folded and received in the automobile steering wheel is always ready to expand smoothly because it is free of blocking for the same reason. Although blocking is otherwise promoted by an increased car interior temperature, the coated fabric is fully resistant against heat and weathering as well as blocking promoted by heat and weather. (4) Since it never happens that the surface of air bag fabric of nylon or the like is locally exposed in the coating due to a partial loss of coating by strike-through, the coating can be uniformly laid up on the fabric.

EXAMPLE

Examples of the present invention are given below by way of illustration and not by way of limitation. Unless otherwise stated, all parts and percents are by weight. The viscosity is a measurement at 25° C. The average degree of polymerization (n) and molecular weight distribution index (Mw/Mn) are calculated from measurements by chromatography under conditions: sample concentration 1% in toluene solution, mobile phase toluene solution, flow rate 1.2 ml/min., detection RI, and temperature 40° C.

EXAMPLE 1

To 100 parts of organopolysiloxane (I) represented by average compositional formula: $((CH_3)_2SiO)_n$, having n=4,000 and Mw/Mn=3 and terminated with vinylmethylsilyl at either end were added 20 parts of hydrophobic fumed silica surface treated with a trimethylsilyl group and having a specific surface area of 230 m²/g and 1.0 part of α, ω-dimethylpolysiloxane diol terminated with silanol. The mixture was heat treated at 180° C. for 2 hours in a kneader, obtaining compound A.

To 100 parts of compound A was added 3.5 parts of a purity 50% organic peroxide (2,4-dichlorobenzoyl peroxide). The mixture was uniformly kneaded and then dissolved in toluene to form a toluene solution I having a silicone content of 25% by weight and having a viscosity of 20,000 cs at 25° C.

Using a knife-over-roll coater, this toluene solution I was applied to one surface of plain weave fabric of 420-denier nylon filaments (46 filaments/inch in warp and weft) to a dry coating weight of about 50 g/m². The coating was heat cured. The coating arrangement is schematically illustrated in FIG. 1. A nylon fabric is unraveled from a roll 1 and fed around rollers including a guide roller, an applicator roller and a backup roll 4. A knife 2 is located just above the applicator roller to apply a coating composition 3 to one surface of the fabric. The coated fabric then passes through a drying zone 5 where it is dried and cured.

During the application procedure, whether or not the composition struck through the fabric was judged with naked eyes and finger touch to the rear surface of the fabric. Also whether or not the coating composition deposited on the backup roll was judged with naked eyes. The results are shown in Table 1.

COMPARATIVE EXAMPLE 1

Compound B was prepared by the same procedure as in Example 1 except that organopolysiloxane (I) was replaced by organopolysiloxane (II) having n=900 and Mw/Mn=3. Compound B was diluted with toluene to form a toluene solution II having a viscosity of 20,000 cs at 25° C. As in Example 1, it was applied and cured to a nylon base fabric.

COMPARATIVE EXAMPLE 2

A compound was prepared by the same procedure as in Example 1 except that organopolysiloxane (I) having n=4,000 and Mw/Mn=3 and organopolysiloxane (II) having n=900 and Mw/Mn=3 were mixed to form an organopolysiloxane (III) having n=3,500 and Mw/Mn=6. This compound was diluted with toluene to form a toluene solution III having a viscosity of 20,000 cs at 25° C. As in Example 1, it was applied and cured to a nylon base fabric.

COMPARATIVE EXAMPLE 3

A compound was prepared by the same procedure as in Example 1 except that organopolysiloxane (I) was replaced by organopolysiloxane (IV) having n=12,000 and Mw/Mn=3. This compound was diluted with toluene to form a toluene solution IV having a viscosity of 200,000 cs at 25° C. As in Example 1, it was applied and cured to a nylon base fabric.

EXAMPLE 2

A compound was prepared by the same procedure as in Example 1 except that organopolysiloxane (I) was replaced by organopolysiloxane (V) having n=1,000 and Mw/Mn=3. This compound was diluted with toluene to form a toluene solution V having a viscosity of 200,000 cs at 25° C. As in Example 1, it was applied and cured to a nylon base fabric.

EXAMPLE 3

A compound was prepared by the same procedure as in Example 1 except that organopolysiloxane (I) was replaced by organopolysiloxane (VI) having n=10,000 and Mw/Mn=4. This compound was diluted with toluene to form a toluene solution VI having a viscosity of 200,000 cs at 25° C. As in Example 1, it was applied and cured to a nylon base fabric.

As in Example 1, the strike-through and deposition of the coating composition to the backup roll were examined in Examples 2-3 and Comparative Examples 1-3. The results are also shown in Table 1.

TABLE 1

|  | Example | | | Comparative Example | | |
|---|---|---|---|---|---|---|
|  | 1 | 2 | 3 | 1 | 2 | 3 |
| Mw/Mn | 3 | 3 | 4 | 3 | 6 | 4 |
| n | 4,000 | 1,000 | 10,000 | 900 | 3,500 | 12,000 |
| Toluene solution | I | V | VI | II | III | IV |
| Silicone content (%) | 25 | 80 | 15 | 95 | 30 | 10 |
| Viscosity (cs)** | 20,000 | 21,500 | 22,000 | 21,000 | 20,500 | 21,100 |
| Coating weight (g/m$^2$) | 50 | 58 | 40 | 60 | 53 | 208* |
| Strike-through | no | no | no | yes | yes | no |
| Deposit | no | no | no | yes | yes | no |

*could not be applied to a predetermined weight.
**measured value

As seen from the Table 1, the coating compositions within the scope of the invention can be applied to air bag base fabric a desirable thickness without strike-through.

We claim:

1. An air bag comprising a base fabric having applied thereon a cured coating of an air bag coating composition, said fabric being plain weave fabric, said coating composition having a viscosity of 10,000 to 50,000 cs at 25° C. comprising:

100 parts by weight of an organopolysiloxane of the following average compositional formula (1):

$$R_aSiO_{(4-a)/2} \tag{1}$$

wherein R is a substituted or unsubstituted monovalent hydrocarbon group and letter a is a number of 1.98 to 2.01, having a degree of polymerization of 1,000 to 10,000 and a molecular weight distribution index (Mw/Mn) of less than 5, and about 10 to 1,000 parts by weight of an organic solvent, and said air bag having no strike-through of the coating composition.

2. The air bag of claim 1 wherein in the organopolysiloxane of the coating composition the R groups are alkyl, cycloalkyl, alkenyl, phenyl or tolyl groups, each optionally substituted with halogen atoms or cyano groups.

3. The air bag of claim 1 wherein in the organopolysiloxane of the coating composition 50 mol % of the R groups are methyl.

4. The air bag of claim 1 wherein in the organopolysiloxane of the coating composition the degree of polymerization is 2,000 to 6,000.

5. The air bag of claim 1 wherein in the organopolysiloxane of the coating composition the molecular weight distribution index is from 1.0 to 4.5.

6. The air bag of claim 1 wherein the organic solvent in the coating composition is benzene, toluene, xylene, hexane, heptane or kerosine.

7. The air bag of claim 1 wherein the base fabric is a polyamide or polyester fabric.

* * * * *